United States Patent
Fay et al.

(10) Patent No.: US 8,595,246 B2
(45) Date of Patent: Nov. 26, 2013

(54) SYSTEM AND METHOD FOR SEMANTIC ASSET SEARCH IN A METADATA REPOSITORY

(75) Inventors: Sharon Y. Fay, Bay Village, OH (US); Jay A. Holmstrom, Cleveland, OH (US); Bradley Carroll Wright, St. Louis, MO (US)

(73) Assignee: Oracle International Corporation, Redwood Shores, CA (US)

( * ) Notice: Subject to any disclaimer, the term of this patent is extended or adjusted under 35 U.S.C. 154(b) by 780 days.

(21) Appl. No.: 12/193,651

(22) Filed: Aug. 18, 2008

(65) Prior Publication Data

US 2009/0049040 A1  Feb. 19, 2009

Related U.S. Application Data

(60) Provisional application No. 60/956,614, filed on Aug. 17, 2007.

(51) Int. Cl.
G06F 7/00 (2006.01)
G06F 17/30 (2006.01)

(52) U.S. Cl.
USPC ............................................. 707/758

(58) Field of Classification Search
USPC ........................ 707/758, 1, 999.01
See application file for complete search history.

(56) References Cited

U.S. PATENT DOCUMENTS

| | | | |
|---|---|---|---|
| 6,061,675 A * | 5/2000 | Wical | 706/45 |
| 7,072,883 B2 * | 7/2006 | Potok et al. | 1/1 |
| 7,181,454 B1 | 2/2007 | McClamroch et al. | |
| 7,272,595 B2 * | 9/2007 | Tsuchitani et al. | 1/1 |
| 7,322,024 B2 | 1/2008 | Carlson et al. | |
| 7,644,052 B1 * | 1/2010 | Chang et al. | 706/45 |
| 8,412,813 B2 * | 4/2013 | Carlson et al. | 709/224 |
| 2003/0009455 A1 * | 1/2003 | Carlson et al. | 707/6 |
| 2003/0056022 A1 * | 3/2003 | Carlson et al. | 709/315 |
| 2004/0010491 A1 * | 1/2004 | Riedinger | 707/3 |
| 2004/0122808 A1 * | 6/2004 | Martin et al. | 707/3 |
| 2004/0153968 A1 | 8/2004 | Ching et al. | |
| 2005/0055344 A1 * | 3/2005 | Liu et al. | 707/3 |
| 2006/0036592 A1 * | 2/2006 | Das et al. | 707/4 |
| 2006/0036633 A1 * | 2/2006 | Chong et al. | 707/101 |
| 2006/0047692 A1 * | 3/2006 | Rosenblum et al. | 707/102 |
| 2007/0033567 A1 * | 2/2007 | Carlson et al. | 717/100 |
| 2007/0050467 A1 | 3/2007 | Borrett et al. | |
| 2007/0168340 A1 | 7/2007 | Mahoney et al. | |
| 2007/0276810 A1 * | 11/2007 | Rosen | 707/3 |
| 2008/0120294 A1 | 5/2008 | Davis | |
| 2008/0133482 A1 * | 6/2008 | Anick et al. | 707/3 |

OTHER PUBLICATIONS

"IMS Digital Repositories Interoperability—Core Functions Information Model," Version 1.0 Final Specification, IMS Global Learning Consortium, Inc., Jan. 13, 2003, pp. 1-17, http://www.imsglobal.org/digitalrepositories/driv1p0/imsdri_infov1p0.html#1253374.

(Continued)

*Primary Examiner* — Robert Beausoliel, Jr.
*Assistant Examiner* — Michael Pham
(74) *Attorney, Agent, or Firm* — Fliesler Meyer LLP (57) ABSTRACT

Embodiments of the invention are generally related to semantic search and service metadata repositories, particularly with regards to methods and systems for performing a semantic asset search in a service metadata repository. One embodiment includes identifying service metadata assets with similar metadata, relationships, and categorizations to the service metadata assets with the most relevant keywords and identifying service metadata assets have been used in conjunction with the one or more selected service metadata assets.

23 Claims, 3 Drawing Sheets

(56) References Cited

OTHER PUBLICATIONS

Borenstein, Joram, "Meta-Data Repositories Meet Semantics," The Data Administration Newsletter, Jul. 1, 2004, http://www.tdan.com/view-articles/5219.

"webMethods Acquires Metadata Manager Cerebra," Aug. 21, 2006, ebiz, SOA in Action, http://www.ebizq.net/news/7225.html.

Madsen, Erling V., "Enterprise Requirements Management—using Rational Asset Manager," Technical University of Denmark, May 5, 2008, http://orbit.dtu.dk/getResource?recordId=220259&objectId=1&versionId=1.

Joueidi, Sami, et al., "Asset Based Development and Rational Asset Manager," IBM Software Group, IBM Corporation, 2007, http://www.nf-rug.com/attachments/RAM%20nflrug.ppt.

"Explore IBM Rational Asset Manager," http://www.ibm.com/developerworks/rational/library/07/rt-ramevalguide/section2.html (accessed Nov. 14, 2008).

"LogicLibrary Introduces Logidex 5.5," Business Wire, http://findarticles.com/p/articles/mi_m0EIN/is_2007_May_1/ai_n27220147 (accessed Nov. 14, 2008).

Eichmann, David., et al., "Integrating Structured Databases Into the Web: The MORE System," http://www94.web.cern.ch/www94/PapersWWW94/more.ps (accessed Nov. 14, 2008).

"Asset Management Software," Novo Solutions,Inc., http://www.novosolutions.com/asset-managements-software/ (accessed Nov. 14, 2008).

Srivastava, B., et al , "Enhancing Asset Search and Retrieval in a Services Repository using Consumption Contexts," IEEE Xplore, http://ieeexplore.ieee.org/Xplore/login.jsp?url=/iel5/4278609/4278610/04278673.pdf?tp=&isnumber=&arnumber=4278673 (accessed Nov. 14, 2008).

"Select Assessment Item," http://porteco.samis.sa.gov.au/lexicon/content/PASelectItem.html#measures (accessed Nov. 14, 2008).

"Search Appliance—Integration with Metadata Management Framework—Integrating Search and Categorization with the InfoLibrarian™ Enterprise Metadata Management Framework," InfoLibrarian™, http://www.infolibcorp.com/SearchApplianceIntegrationMetadata.pdf (accessed Nov. 14, 2008).

"Distributed Semantic Metadata Repository," HP Labs, Hewlett-Packard Development Company, L.P., http://www.hpl.hp.com/research/ssre/competitive/metadata/ (accessed Nov. 14, 2008).

"Active Metadata Integration," A Cerebra White Paper, Cerebra®, Inc., http://me.jtpollock.us/pubs/2006.02-Whitepaper_Active.pdf (accessed Nov. 14, 2008).

Weaver, Steve, IBM Rational podcast, http://www.ibm.com/podcasts/software/rational/steverweaverRAM-WSRR_transcript.pdf (accessed Jan. 26, 2009).

IBM Rational Asset Manager, http://www-01.ibm.com/software/awdtools/ram/features/index.html?S_CMP=wspace (accessed Jan. 26, 2009).

IBM Software Group, Rational Asset Manager, Demonstration, http://download.boulder.ibm.com/ibmdl/pub/software/info/television/swtv/Rational_Software/demos/ram/ram-ov/052107-RAM-Overview.html (accessed Jan. 26, 2009).

Introduction to IBM Rational Asset Manager, http://publib.boulder.ibm.com/infocenter/ramhelp/v7r0m0/index.jsp (accessed Jan. 26, 2009).

IBM Rational Asset Manager, Component Source®, http://www.componentsource.com/products/ibm-rational-asset-manager/index.html (accessed Jan. 26, 2009).

"PEAR Glossary," Version 1.0, pp. 1-21, Business Solutions Center of Excellence (BSCoE), Jun. 25, 2008.

http://www.portal.state.pa.us/imageserver/videos/findingassets1.wmv (accessed Jan. 26, 2009).

* cited by examiner

SYSTEM AND METHOD FOR SEMANTIC ASSET SEARCH IN A METADATA REPOSITORY

CLAIM OF PRIORITY

The present application claims the benefit of priority under 35 U.S.C. §119(e) to U.S. Provisional Patent Application No. 60/956,614 entitled "SYSTEM AND METHOD FOR SEMANTIC ASSET SEARCH IN A METADATA REPOSITORY," filed on Aug. 17, 2007, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATION

The following U.S. patent application is cross-referenced and incorporated herein by reference:

U.S. patent application Ser. No. 12/193,664 entitled "SYSTEM AND METHOD FOR MANAGING ONTOLOGIES AS SERVICE METADATA ASSETS IN A METADATA REPOSITORY," filed Aug. 18, 2008.

FIELD OF THE INVENTION

This invention is related to Semantic Technology and Service Metadata Repositories in the Information Technology field, particularly with regard to utilizing semantic technology to search for assets in a service metadata repository.

BACKGROUND

Service-Oriented Architecture (SOA) is based on the deconstruction of yesterday's monolithic applications and information technology infrastructure into a matrix of discrete, standards-based, network-accessible services. The process of transformation requires the organization, identification, and repurposing of applications and business processes of the existing information technology (IT) infrastructure. The transformation to SOA begins with an analysis of the IT infrastructure to identify applications, business processes, and other software assets that become services, or otherwise support the SOA.

Metadata is data about data, or more specifically, information about the content of the data; service metadata is information about the services in an SOA. Service producers use service metadata to describe what service consumers need to know to interact with the service producers. Service metadata is stored in a metadata repository by service producers and then accessed by service consumers. A metadata repository provides visibility into the portfolio of assets, the traceability of the assets within that portfolio, the relationships and interdependencies that connect the assets to each other, the policies that govern use of the assets, and the projects that produce the assets and consume the assets.

DETAILED DESCRIPTION

Service-Oriented Architecture (SOA) is a new approach to information technology that connects people, process, and technology in a dynamic, distributed environment. Although SOA provides the agility required to innovate and compete in today's economy, it also increases system complexity. To mitigate this risk, organizations control and track information technology investments to ensure alignment with corporate objectives. A service metadata repository enables SOA governance that provides comprehensive insight into the business impact of SOA. A service metadata repository can enable SOA governance to span the SOA lifecycle and unite resources from across divisions and geographies in a collaborative holistic approach to corporate decision-making and compliance by providing the automated exchange of metadata and service information among service consumers, providers, policy decision points, and other governance tools.

A service metadata repository provides role-based visibility into all SOA assets, regardless of source, through a centralized repository for business processes, services, applications, components, models, frameworks, policies, and data services. Visibility into assets under development minimizes redundancy and promotes service collaboration and reuse. A service metadata repository could also graphically display and navigate asset-to-asset and asset-to-project relationships and interdependencies to simplify impact analysis and ensure business alignment by enabling users to organize and link SOA assets to associated business processes.

Semantic technology encodes meanings separately from data and content files, and separately from application code. Semantic technologies include tools for auto-recognition of topics and concepts, information and meaning extraction, and categorization. Semantic technologies provide an abstraction layer above existing technologies that enables interconnection of data, content, and processes.

In order to enhance reuse of service metadata in a service metadata repository, users need to be able to search for service metadata assets. What is needed is a way to perform a semantic asset search on service assets in a service metadata repository.

Figure 1:
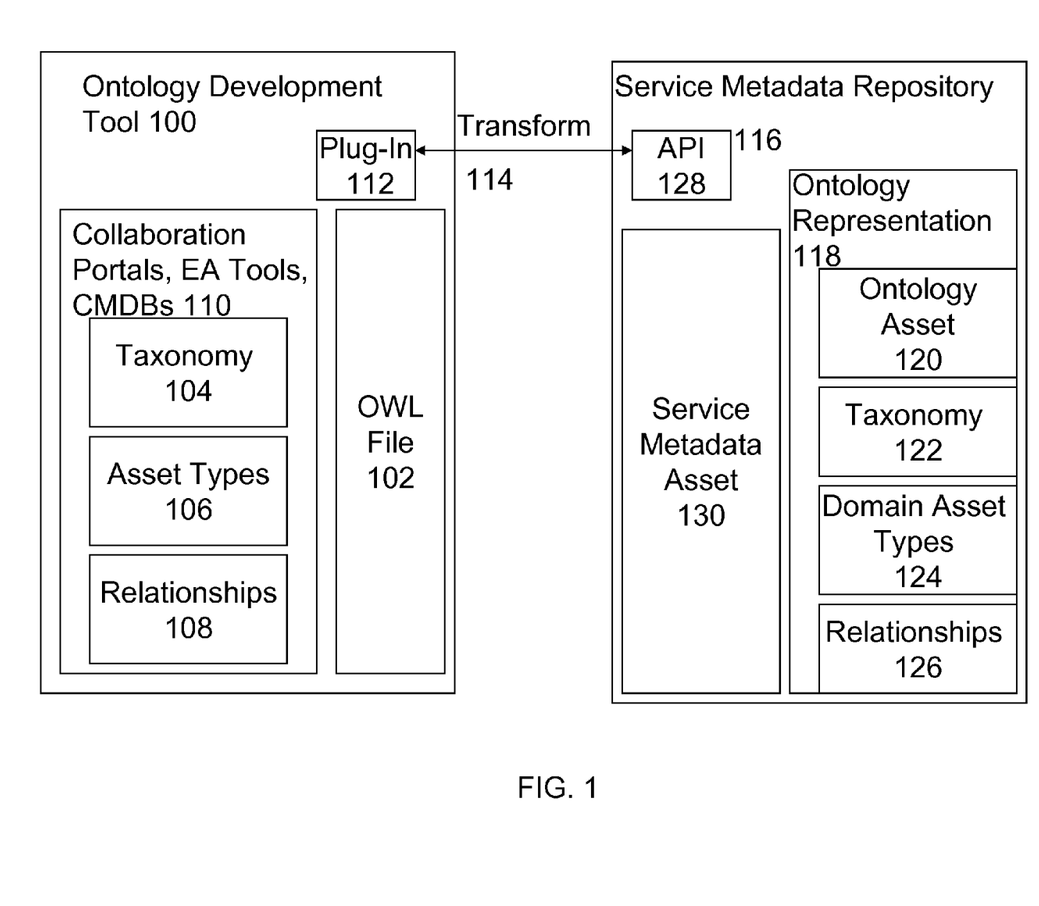
FIG. 1 shows a system for managing ontologies produced by ontology development tools as assets in a service metadata repository.

One embodiment is a system that manages ontologies as assets in a service metadata repository. FIG. 1 shows an architecture for managing ontologies produced by development tools as service metadata assets in a service metadata repository. Ontology development tools 100 include tools that can produce a web ontology language (OWL) file 102, including Collaboration Portals, Enterprise Architecture tools, and Configuration Management Databases 110. In order to develop an ontology using OWL, a taxonomy 104, asset types 106, and relationships 108 need to be identified. A plug-in 112 in the ontology development tool 100 communicates to an API 128 in the service metadata repository 116 in order to automatically transform 114 an OWL file 102 into a service metadata repository asset 130 stored in the service metadata repository 116. The process further requires mapping the OWL taxonomy 104 into a service metadata repository taxonomy 122. Finally, the process maps the OWL asset type 106 into a domain asset type 124 and maps the OWL relationships 108 into metadata repository relationships 126.

In one embodiment, a data transformation utility transforms 114 an OWL file 102 into a format for storing in the service metadata repository 116 as a service metadata asset 130. In one embodiment, the data transformation utility is part of the plug-in 112. In one embodiment, the data transformation utility is part of the API 128. In one embodiment, the data transformation utility is separate from the plug-in 112 and the API 128. In one embodiment, the API 128 is a service metadata repository extensibility framework API that provides programmatic access to service metadata repository functionality.

Figure 2:
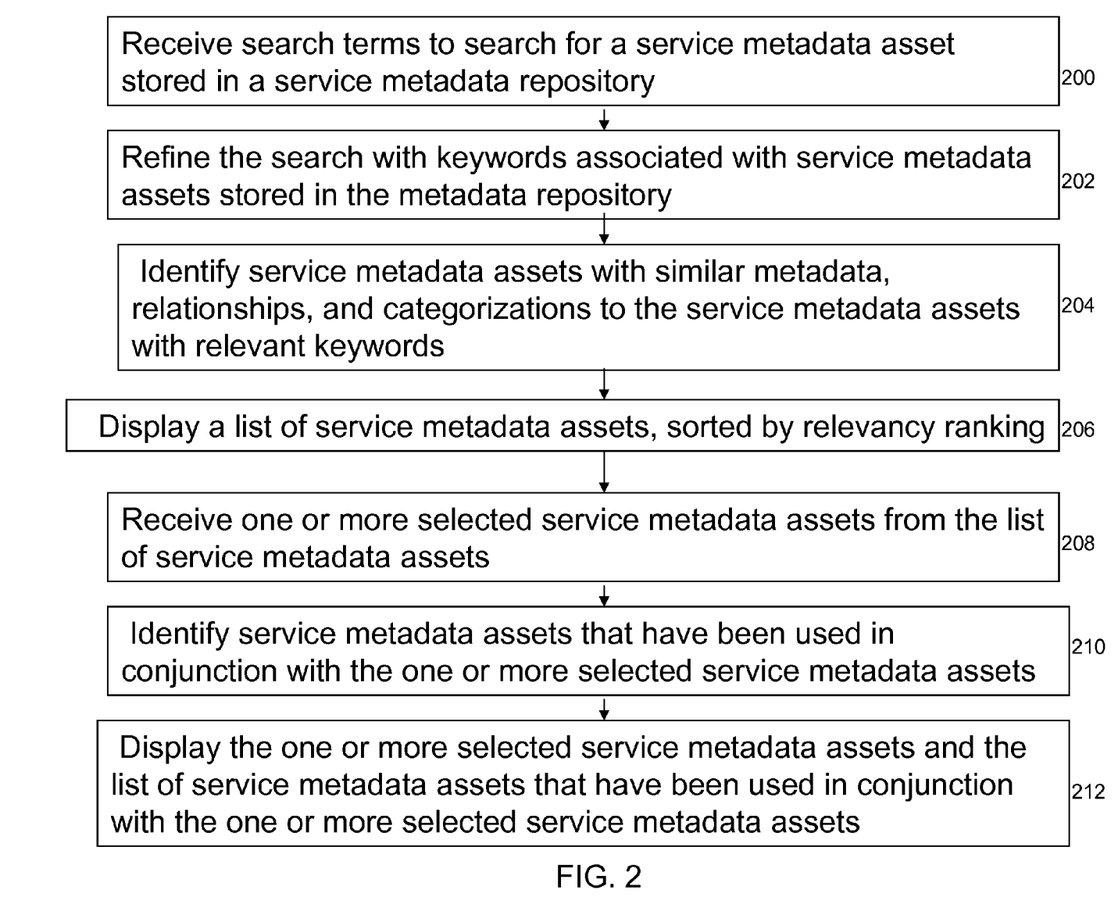
FIG. 2 shows one embodiment of a method for performing a semantic asset search in a metadata repository.

One embodiment comprises a method for performing a semantic asset search in a service metadata repository, shown in FIG. 2. In step 200, the service metadata repository receives search terms for an asset stored in the metadata repository. In step 202, the service metadata repository refines the search with keywords associated with assets stored in the metadata repository. In step 204, the service metadata repository identifies assets with similar metadata, relationships, and categorizations to the assets with the most relevant keywords. In step 206, the service metadata repository displays a list of assets, sorted by relevancy ranking. In step 208, the service metadata repository receives one or more selected service metadata assets from the list of service metadata assets. In step 210, the service metadata repository identifies service metadata assets that have been used in conjunction with the one or more selected assets. In step 212, the service metadata repository displays the one or more selected assets and the list of assets that have been used in conjunction with the one or more selected assets.

Figure 3:
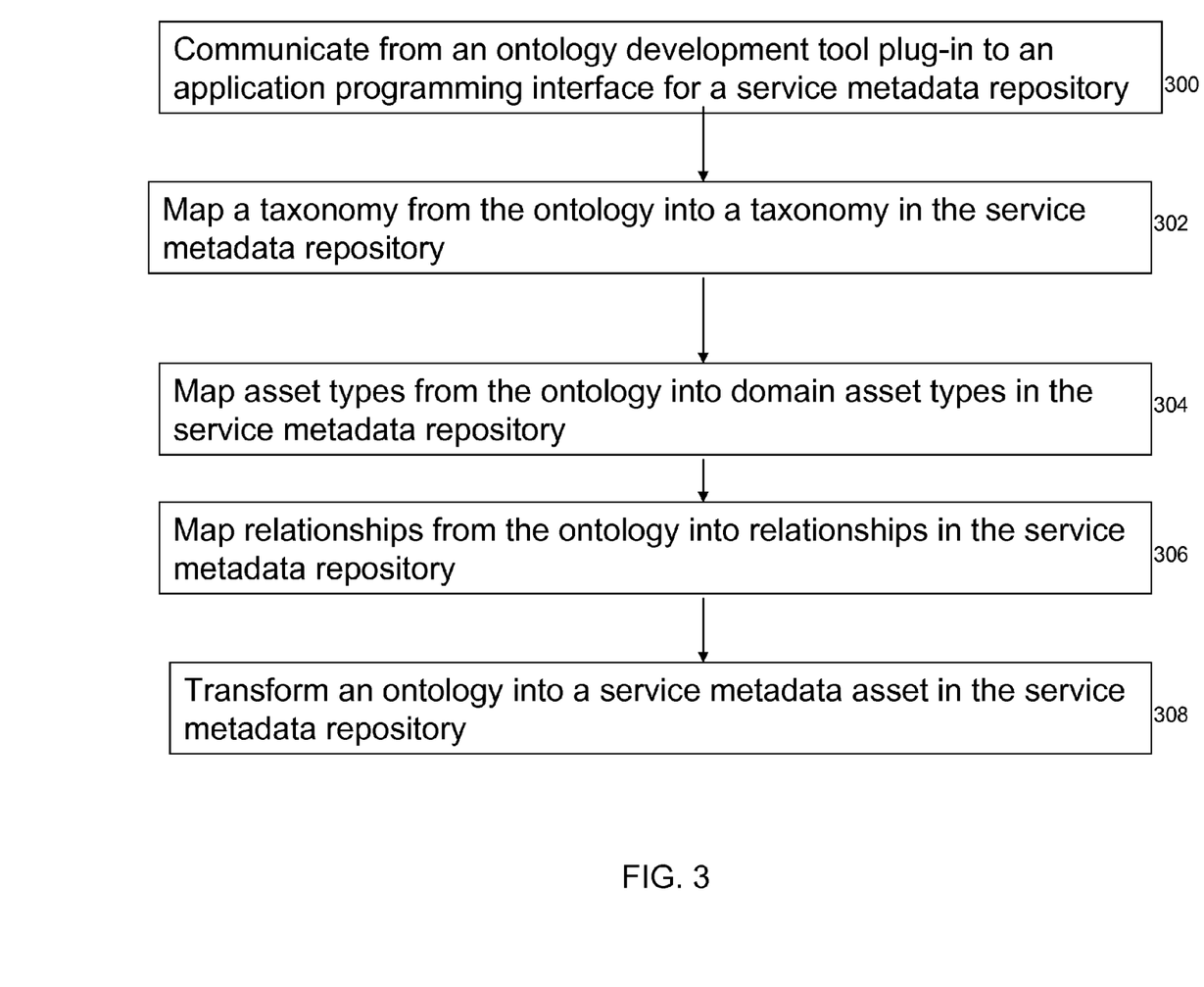
FIG. 3 shows a method for transforming an ontology in an ontology development tool into a service metadata asset in a service metadata repository.

One embodiment comprises a method for transforming an ontology into an asset in a service metadata repository, shown in FIG. 3. In step 300, a data transformation utility communicates information from an ontology development tool plug-in to an application programming interface for a service metadata repository. In step 302, the data transformation utility maps a taxonomy from an ontology in the ontology development tool into a taxonomy in the service metadata repository. In step 304, the data transformation utility maps asset types from the ontology in the ontology development tool into domain asset types in the service metadata repository. In step 306, the data transformation utility maps relationships from the ontology in the ontology development tool into relationships in the service metadata repository. In step 308, the data transformation utility transforms an ontology into a service metadata asset in the service metadata repository.

A metadata repository is the enterprise system of record for the software asset portfolio. The metadata repository federates metadata from individual registries and repositories. It manages all software assets and their relationships, including business processes, applications, patterns, frameworks, services and components (corporate, packaged or open source). The metadata repository has links to content in other systems (source code management systems, project portfolio management systems, document management systems, etc.) and exposes a web-service-based API for integration. The metadata repository promotes enterprise visibility and access. In one embodiment, additional features include web-based accessibility with role-based access control, a "transparent" development experience, and project portfolio management integration.

The metadata repository enables governance and compliance initiatives within an organization. A metadata repository enables automated tracking of compliance with architecture standards and regulatory requirements. A metadata repository provides for prescriptive reuse and policy, validation, certification and approvals for registered content.

In one embodiment, the metadata repository provides an analytics capability, wherein users can automatically calculate the value of the software asset portfolio, savings from use and reuse of assets, software investment return on investment (ROI), and impact analysis for IT planning decisions.

In one embodiment, the metadata repository is an enterprise repository that links multiple repositories together. The metadata repository integrates with project portfolio management systems such as CA Clarity™ and Mercury ITG. The metadata repository brings visibility of the asset portfolio and aligns it with the project portfolio. The metadata repository integrates with document management systems because frequently documentation, requirements, etc. are managed within document management repositories but need to be accessed from the asset entry within the metadata repository. The metadata repository integrates with source code management systems for code and artifacts, with build tools to harvest assets and update the status of assets. The metadata repository captures business processes and metadata through Business Process Execution Language (BPEL) introspection. The metadata repository supports the Application Programming Interfaces (APIs) for Universal Description, Discovery and Integration (UDDI) for interoperability. For organizations that have UDDI registries, the metadata repository interoperates with UDDI registries. The metadata repository can sit on top of Systinet or any other UDDI-compliant registry and bring service metadata into the metadata repository where it can be augmented and tied into the balance of the information technology ecosystem. One embodiment of the metadata repository integrates with modeling tools including Microsoft Visio®. One embodiment integrates with modeling tools such as Aris™, Popkin, and Troux.

In one embodiment, the metadata repository provides greater capabilities than just storing metadata. The metadata repository functions as a software asset management platform. It enables organizations to improve governance of the asset portfolio, enable compliance with both enterprise architecture and project-specific objectives, and provide a platform to reduce and manage complexity to lower costs and increase business agility.

Search

Semantic technology can search across multiple instances of a metadata repository, i.e. federated repositories. This technology can serve as a "corporate dictionary" or "global thesaurus" for a metadata repository, such that portfolio managers can select relevant asset keywords for their assets/projects, and users can find and reuse existing functionality, regardless of their search terminology.

Asset lifecycle tracking can be enhanced by semantic technology by searching across multiple repositories (metadata repositories, source code management systems, CMDBs, enterprise architecture repositories, metadata repositories, etc.), finding information about the same asset in planning, development, and deployed states.

Searching for artifacts associated with assets can be enabled by semantic technology in order to identify relevant assets. Examples of artifacts include design documents, requirements documents, development coding guidelines, etc.

A set of secondary search results related to the initial search criteria can be produced by semantic technology. This is similar to an extended affinity.

Searching Federated Repositories

Organizations may deploy multiple instances of a metadata repository as single purpose repositories. For example, there might be a separate instance for each organizational domain, or one instance might manage the organization's application portfolio, while another instance might be externally facing to provide services to third parties. In such instances, the ability to search across multiple instances of the metadata repository and return an aggregated search result set is desirable.

Users may only be authorized to view subsets of assets within federated repositories. User permissions may need to be identified through advanced role-based access control (RBAC) settings. Only valid users of the system with the appropriate permissions can enter asset search criteria. The user is then presented with an aggregated set of search results with links to the appropriate asset details within each repository. The user can then activate the search result links to access asset details.

Corporate Dictionary/Global Thesaurus

One of the reasons that organizations fail to identify existing functionality is because there is not a common vocabulary used to describe and categorize existing assets. This causes organizations to build redundant functionality, resulting in increased development, maintenance, and operations costs. Including a corporate dictionary or global thesaurus in a metadata repository will solve this problem. In the entry of asset metadata, project metadata or categorization entries, the dictionary/thesaurus supplies words to any drop-down menus in metadata templates to ensure consistency in terminology throughout the metadata repository. Consideration should be given to this functionality on automatic import of asset metadata from another system of record.

When the metadata repository is subsequently searched, the search keywords should resolve toward words included in the dictionary/thesaurus as follows. Users enter keywords into the search. If the keyword matches something in the dictionary/thesaurus, then the metadata repository presents asset or project hits on the dictionary entry. If the keyword does not match something in the corporate dictionary, then the system prompts the user to choose which word(s) in the dictionary most closely match the keyword. As an alternative, the system could automatically select the words that most closely match.

Only those users with permission to edit asset metadata/project information in the metadata repository would be able to select relevant keywords for assets/projects. Any user would be able to search the metadata repository leveraging the dictionary/thesaurus. The search criteria may not be an exact match of the terms included in the asset name, description, or keywords. The result is that the user is presented with a set of search results and relevancy ratings, sorted by relevancy rating, and including links to the appropriate asset details. The user can then activate the search result links to access asset details.

Asset Lifecycle Tracking

Throughout its lifecycle, information about an asset may be represented in multiple tools and repositories across an organization. For example, asset planning information might appear in an architecture tool, a visual modeling tool, a business process management tool, within documents in a document management system, etc. During development, information about an asset might appear in integrated development environments (IDEs), version control and source control management systems (SCMs), testing tools, etc. Once deployed, information about an asset might appear in a service registry, a service bus, in web service management/monitoring (WSM) tools, in configuration management databases (CMDBs), in defect/change management systems, etc. Information about an asset may appear in the metadata repository at any point in its lifecycle. There is a need to identify all references to an asset, regardless of the reference location.

The most likely users are asset portfolio managers that will harvest and package the lifecycle information from these various sources into a single asset reference within the metadata repository. When a valid user of the system with the appropriate permissions enters asset search criteria, the user is presented with an aggregated set of search results with links to the appropriate asset details within each tool/repository. Users with permission to create/edit assets in the metadata repository will have the option of aggregating this information into a single asset reference within the metadata repository.

Searching Related Artifacts

Search terms entered by a user may appear in documents or links associated with the asset, rather than in the asset's metadata or keywords. Examples of artifacts include design documents, requirements documents, architecture diagrams, development coding guidelines, etc. It is necessary to search these associated files and links in order to return a more robust and relevant search result set. A valid user of the system with the appropriate permissions enters asset search criteria and the system searches asset metadata and associated asset artifacts (represented as links in the asset metadata). The user is subsequently presented with an aggregated set of Asset search results with links to the appropriate asset details. The user can then activate the search result links to access asset details.

Affinity

In cases where a user is unfamiliar with assets in the metadata repository, it is helpful not only to offer up sets of assets that directly match a user's search criteria, but also present secondary sets that might be of interest. In one embodiment, the metadata repository identifies assets that other people have used in conjunction with the primary asset of interest. In one embodiment, the metadata repository produces a set of extended search results, such as a set of assets with similar metadata, common relationships, the same categorizations, etc. This is a "suggestive selling" approach for asset consumers, and it also assists asset portfolio managers in analyzing relationships within their asset portfolios. This enables synergy in the asset portfolio and across asset portfolios. A valid user of the system with the appropriate permissions enters asset search criteria, the system searches asset metadata (including metadata fields, relationships, categorizations, and associated artifacts) to identify a secondary set of search results with an affinity to the primary search results, and the user is presented with a primary and secondary set of asset search results with links to the appropriate asset details within the metadata repository. The user can then activate the search result links to access asset details.

Intelligence and Automation

Automated semantic technology can assist asset portfolio managers, domain experts, etc. in identifying redundant functionality and providing an automated solution for the asset organization tasks necessary to resolve a problem. Redundant functionality may exist within or outside of the metadata repository. Examples include: identifying that two or more assets deliver similar functionality and suggesting consolidation; and identifying commonalities among multiple sets of project requirements as opportunities to develop or harvest an asset to meet the multiple sets of project requirements.

Relationships between assets can be revealed by semantic technology. Categorizations and new taxonomies for groups of assets are easier to identify. This technology can also provide an ad hoc rollup of related asset information (such as metadata from enterprise repositories, documents stored in a document management system, code stored in a version control system, defects and change requests in a defect tracking system, etc.), and provide an option to automatically package related information into a single asset in the metadata repository.

Assets in the metadata repository that might be relevant to a project, based on the project's requirements, can be identified. Requirements might be articulated through a project profile in the metadata repository, a requirements document, a requirements management system, etc. Project profiles can be built based on pre-defined information. A repository "clean-up" function can be provided, suggesting assets within the metadata repository that should be retired or decommissioned.

Asset Consolidation

Redundant functionality results in increased maintenance and operations costs. Redundancy might occur as early as project planning, at which time common requirements and opportunities to develop common functionality go unrecognized. Organizations rely upon asset portfolio managers, domain experts, architects, etc. to identify redundant functionality and suggest consolidation opportunities.

During project planning, redundant requirements might appear in project portfolio management tools, requirements management tools, etc. During development, redundant functionality might appear in integrated development environments (IDEs), source code management, version control and source control management systems (SCMs), testing tools, etc. Once deployed, redundant functionality might appear in a service registry, a service bus, in web service management/monitoring (WSM) tools, in configuration management databases (CMDBs), in defect/change management systems, etc. Redundant functionality may also appear in the metadata repository. An automated method for identifying redundant functionality and suggesting consolidation opportunities would be of great benefit.

Typical users are asset portfolio managers, domain experts, architects, project portfolio managers, operations managers, etc. The users can schedule the redundancy identification function to run on automatic intervals. The users are then presented with a list of redundant functionality/opportunities for consolidation. The users can select groups of assets to consolidate, which creates a "proposed" asset in the metadata repository with relationships to all of the redundant functionality to be replaced. The users can identify assets that are not consolidation targets, and these assets can be removed from future result sets.

Identify Asset Relationships

As the metadata repository gathers assets from software applications, such as enterprise service buses, data service platforms, service registries, business process management systems, etc., there will be a need to identify the way in which these assets relate to each other, and to allow a user to easily establish these relationship links in the metadata repository.

The typical users are asset portfolio managers who will need to establish meaningful relationships among assets in the metadata repository. The users can schedule the relationship identification function to run on automatic intervals. Users are presented with a list of assets and suggested relationships. The users select the desired asset relationships. Users can identify asset relationships that are not meaningful, and those asset relationships can be removed from future result sets.

Identify Asset Categorizations and Taxonomies

As the metadata repository gathers assets from software applications, such as enterprise service buses, data service platforms, service registries, business process management systems, etc., there will be a need to organize these assets into meaningful taxonomies within the metadata repository. There will also be a need to suggest new taxonomies and organizational constructs as the inventory of assets grows.

The most likely users are asset portfolio managers who will need to organize their assets in the metadata repository. Users may schedule the categorization/taxonomy identification function to run on automatic intervals. Users are presented with a list of assets and suggested categorizations or new taxonomies. Users may select the desired asset categorizations/new taxonomy. Users may identify asset categorizations/taxonomies that are not meaningful, and those asset categorizations/taxonomies can be removed from future result sets.

Automated Packaging

An asset in the metadata repository consists of metadata and supporting documentation (which is stored in other systems and appears as a Universal Resource Indicator (URI) in the metadata repository). If semantic technology can be used to identify all references to instances of the same asset, and present these to the metadata repository, then the user should have the option to generate an asset in the metadata repository that populates the metadata from these other sources and creates links to all related information and instances of the asset.

Typical users are asset portfolio managers, domain experts, etc. Users may schedule the search function to run on automatic intervals. Users are presented with a list of information pertaining to an asset. Users may select the information that will populate the asset metadata and be linked to the asset. Users may identify information that is not relevant. This information should be removed from future result sets.

Asset Suggestion

Project requirements might be captured in a project portfolio management tool, a project management tool, a requirements management tool, in a project requirements document within a document management system, as metadata in a project profile in the metadata repository, etc. There is a need to automatically identify sets of assets in the metadata repository based on a project's requirements, to provide the user with a means of selecting relevant assets, and to package selected assets into the metadata repository project profile.

Typical users are project architects, business analysts, and project technical leads. Users identify the source of the project requirements. Users are presented with a list of assets in the metadata repository that may meet the project's requirements. Users select the assets that are relevant. Relevant assets are added to the metadata repository project profile, if the profile already exists. A new project profile is created in the metadata repository if there is no pre-existing project profile.

Asset Cleanup

In order to keep the metadata repository populated with the most relevant sets of assets, the asset inventory should be periodically examined and cleansed of assets that are not being used, assets that have poor user ratings, assets that have incomplete metadata, etc. The most likely users are asset portfolio managers. The users may schedule the clean-up function to run on automatic intervals. The users are presented with a list of assets in the metadata repository that are candidates for cleansing. The users select the assets and determine a course of action. Courses of action may include: Retirement—moved to a "retired" state in the metadata repository and asset users are notified. Deletion—moved to a "deleted" state in the metadata repository. Enhancement—asset remains at the current version and additional metadata, documentation, etc. is added. Reengineering—a new version of the asset is created in the metadata repository in a "proposed" state.

Ontology Definitions

Collection: Any grouping of items into a single container. The metadata repository equivalent is a Taxonomy.

Class: A set of things with common characteristics. The metadata repository equivalent is an AssetType.

Instance: Occurrence or specific member of a class. The metadata repository equivalent is an Asset.

Ontology: A formal representation of a set of concepts within a domain and the relationships between those concepts. It is used to reason about the properties of that domain, and may be used to define the domain. Ontologies are used in artificial intelligence, the Semantic Web, software engineering, biomedical informatics, library science, and information architecture as a form of knowledge representation about the world or some part of it Subclass or Slot: Properties of each class describing various features and attributes of the class. The metadata repository equivalent is a Metadata Field.

Ontology Asset Type—Metadata Fields. Metadata Fields describe the domain covered by the ontology, who uses the ontology, and who maintains the ontology.

Ontologies

A configured instance of the metadata repository represents one or more ontologies. There is a programmatic mapping between the OWL Web Ontology Language and the metadata repository XML formats. A data transformation utility can be written to convert between formats. Ontologies can be developed in other tools, such as collaborative portals, enterprise architecture tools, CMDBs, etc. If these tools use OWL, then ontologies generated by those tools can be shared between the metadata repository and such tools. Ontologies (represented in OWL or other file formats) can be managed as assets within the metadata repository. An ontology is defined as an explicit formal specification of the terms in the domain and relations among them.

Managing OWL Files in a Metadata Repository

The metadata repository manages OWL files. Managing OWL files comprises: managing the lifecycle of OWL files, searching for and evaluating OWL files as reuse candidates, tracking OWL file usage within and external to an organization, tracking the relationship between OWL files and other assets, and collaborating on the concepts, properties, and relationships in a domain that will be captured in an OWL file. The goal is to promote visibility, accessibility, traceability, notification, and collaboration. The approach is to build an OWL asset type in the metadata repository, including relevant taxonomies and relationships.

Deriving Domain Metamodels from OWL Files

Domain meta-models (consisting of taxonomies and common domain relationships) are captured in an inconsistent format within various tools throughout an organization (project portfolio management systems, configuration management databases, version control systems, financial accounting systems, metadata repositories, enterprise architecture repositories, etc.). Typically, there is no easy means of sharing taxonomies between tools and repositories. Therefore, there is a need to use domain meta-models as an organizing principal for managing assets.

OWL can be used as a standard for sharing domain taxonomies and commonly defined relationships between tools and repositories. The metadata repository ontology may be modified in several ways—through the metadata repository API, through an ontology editor such as Knoodl, through the metadata repository administrative functions—so the ontology asset (120) in the metadata repository might not match the actual ontology representation (118) in the metadata repository. In one embodiment, architecture tools, CMDB tools, etc. generate OWL files. One embodiment uses Semantic Annotation for WSDL (SAWSDL). One embodiment uses Simple Knowledge Organizational Systems (SKOS) instead of OWL. SKOS is a set of specifications and standards to support the use of knowledge organization systems such as thesauri, classification schemes, subject heading systems and taxonomies within the framework of the Semantic Web. SKOS is developed and maintained by the W3C Semantic Web Deployment Working Group.

One embodiment may be implemented using a conventional general purpose computer or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media). The present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting the code to a user; providing the code on a physical media to a user; or any other method of making the code available.

Embodiments of the present invention can include a computer-implemented method for transmitting code which can be executed at a computer to perform any of the processes of embodiments of the present invention. The transmitting can include transfer through any portion of a network, such as the Internet; through wires, or any other type of transmission. The transmitting can include initiating a transmission of code, or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

The invention claimed is:

1. A method for supporting semantic software service search within a service metadata repository to promote software service reuse and management, comprising the steps of:
    receiving a plurality of ontology files, wherein each ontology file defines a taxonomy, a plurality of asset types, and relationships between the asset types;
    transforming the plurality of software service ontology files into a service metadata repository using a data transformation utility, by
        mapping each taxonomy to a service metadata asset taxonomy,
        mapping each asset type to a domain asset type,
        mapping each relationship to a service metadata asset relationship, and
        creating a plurality of service metadata assets, wherein each service metadata asset includes a name, asset description, and one or more keywords associated with each corresponding software service;
    storing the service metadata assets in the service metadata repository on a computer readable storage medium;
    receiving, from a user, one or more search terms to search for a particular software service;
    identifying a primary set of service metadata assets by comparing the search terms with the names, asset descriptions and keywords associated with each of the service metadata assets;
    displaying, to the user, the primary set of service metadata assets sorted by relevance ranking;
    receiving, from the user, a selection of one or more service metadata assets from the primary set of service metadata assets;
    searching the service metadata assets for similar metadata, common relationships, and one or more similar categorizations with the selection of the one or more service metadata assets from the primary set of service metadata assets to identify a secondary set of service metadata assets that have been used in conjunction with the selection of the one or more service metadata assets from the primary set of service metadata assets; and
    displaying the selection of the one or more service metadata assets from the primary set of service metadata assets and the secondary set of service metadata assets.

2. The method of claim 1, wherein users with permission to edit asset metadata have permission to specify keywords associated with the service metadata assets.

3. The method of claim 1, wherein any user can search the service metadata repository using keywords in a thesaurus stored in the service metadata repository.

4. The method of claim 1, wherein semantic technology is used to identify one or more references to the service metadata asset, wherein references to the service metadata asset include one of documents and links associated with the service metadata asset.

5. The method of claim 4, wherein the primary set of service metadata assets associated with the one or more keywords of the service metadata assets includes an aggregated set of links to the one or more references.

6. The method of claim 5, wherein the keywords of the service metadata assets comprise terms in the service metadata asset's metadata.

7. The method of claim 6, wherein the keywords of the service metadata assets further comprise terms that appear in documents and links associated with the service metadata asset.

8. The method of claim 7, wherein the documents associated with the service metadata asset comprise design documents, requirements documents, architecture diagrams, and development coding guidelines.

9. The method of claim 1, wherein the metadata repository automatically aggregates multiple documents associated with the service metadata assets into a single service metadata asset.

10. A non-transitory computer-readable medium, including instructions stored therein which when read and executed by a computer cause the computer to perform steps comprising:
    receiving a plurality of software service ontology files, wherein each ontology file defines a taxonomy, a plurality of asset types, and relationships between the asset types;
    transforming the plurality of software service ontology files into a service metadata repository using a data transformation utility, by
        mapping each taxonomy to a service metadata asset taxonomy,
        mapping each asset type to a domain asset type,
        mapping each relationship to a service metadata asset relationship, and
        creating a plurality of service metadata assets, wherein each service metadata asset includes a name, asset description, and one or more keywords associated with each corresponding software service;
    storing the service metadata assets in the service metadata repository on a computer readable storage medium;
    receiving, from a user, one or more search terms to search for a particular software service;
    identifying a primary set of service metadata assets by comparing the search terms with the names, asset descriptions and keywords associated with each of the service metadata assets;
    displaying, to the user, the primary set of service metadata assets sorted by relevance ranking;
    receiving, from the user, a selection of one or more service metadata assets from the primary set of service metadata assets;
    searching the service metadata assets for similar metadata, common relationships, and one or more similar categorizations with the selection of the one or more service metadata assets from the primary set of service metadata assets to identify a secondary set of service metadata assets that have been used in conjunction with the selection of the one or more service metadata assets from the primary set of service metadata assets; and
    displaying the selection of the one or more service metadata assets from the primary set of service metadata assets and the secondary set of service metadata assets.

11. The non-transitory computer-readable medium of claim 10, wherein users with permission to edit asset metadata have permission to specify keywords associated with the service metadata asset.

12. The non-transitory computer-readable medium of claim 10, wherein any user can search the service metadata repository using keywords in a thesaurus stored in the service metadata repository.

13. The non-transitory computer-readable medium of claim 10, wherein semantic technology is used to identify one or more references to the service metadata asset, wherein references to the service metadata asset include one of documents and links associated with the service metadata asset.

14. The non-transitory computer-readable medium of claim 13, wherein the primary set of service metadata assets associated with the one or more keywords of the service metadata assets includes an aggregated set of links to the one or more references.

15. The non-transitory computer-readable medium of claim 14, wherein the keywords of the service metadata assets comprise terms in the service metadata asset's metadata.

16. The non-transitory computer-readable medium of claim 15, wherein the keywords of the service metadata assets further comprise terms that appear in documents and links associated with the service metadata asset.

17. The non-transitory computer-readable medium of claim 16, wherein the documents associated with the service metadata asset comprise design documents, requirements documents, architecture diagrams, and development coding guidelines.

18. The non-transitory computer-readable medium of claim 10, wherein the metadata repository automatically aggregates multiple documents associated with the service metadata assets into a single service metadata asset.

19. A system for supporting semantic software service search within a service metadata repository, comprising:
  one or more processors; and
  a service metadata repository having a data transformation utility, wherein the data transformation utility uses the one or more processors, to receive a plurality of software service ontology files, wherein each ontology file defines a taxonomy, a plurality of asset types, and relationships between the asset types;
  transform the plurality of software service ontology files into a service metadata repository using the data transformation utility, by
    mapping each taxonomy to a service metadata asset taxonomy,
    mapping each asset type to a domain asset type,
    mapping each relationship to a service metadata asset relationship, and
    create a plurality of service metadata assets, wherein each service metadata asset includes a name, asset description, and one or more keywords associated with each corresponding software service;
  store the service metadata assets in the service metadata repository on a computer readable storage medium;
  receive, from a user, one or more search terms to search for a particular software service;
  identifying a primary set of service metadata assets by comparing the search terms with the names, asset descriptions and keywords associated with each of the service metadata assets;
  displaying, to the user, the primary set of service metadata assets sorted by relevance ranking;
  receiving, from the user, a selection of one or more service metadata assets from the primary set of service metadata assets;
  searching the service metadata assets for similar metadata, common relationships, and one or more similar categorizations with the selection of the one or more service metadata assets from the primary set of service metadata assets to identify a secondary set of service metadata assets that have been used in conjunction with the selection of the one or more service metadata assets from the primary set of service metadata assets; and
  displaying the selection of the one or more service metadata assets from the primary set of service metadata assets and the secondary set of service metadata assets.

20. The method of claim 1, wherein the service metadata repository provides an analytics component that calculates a value of the service metadata assets, wherein the value of the service metadata assets is based on a use and reuse of the service metadata assets.

21. The method of claim 1, wherein the service metadata repository has links to content in other systems and exposes a web-service-based API for integration.

22. The method of claim 1, wherein the service metadata repository is an enterprise repository that links multiple repositories together.

23. The system of claim 19, wherein the system enhances software service lifecycle tracking through searching across multiple service metadata repositories and finding information about the same software service in planning, development and deployed states.

* * * * *

UNITED STATES PATENT AND TRADEMARK OFFICE
CERTIFICATE OF CORRECTION

PATENT NO. : 8,595,246 B2  
APPLICATION NO. : 12/193651  
DATED : November 26, 2013  
INVENTOR(S) : Fay et al.

Page 1 of 1

It is certified that error appears in the above-identified patent and that said Letters Patent is hereby corrected as shown below:

On the Title Page, Item (56)

On page 2, column 1, under "Other Publications", line 23, delete "managements" and insert -- management --, therefor.

On page 2, column 2, under "Other Publications", line 10, delete "ssre" and insert -- ssrc --, therefor.

Signed and Sealed this  
Third Day of June, 2014

Michelle K. Lee  
*Deputy Director of the United States Patent and Trademark Office*